United States Patent [19]

Watanabe

[11] Patent Number: 5,084,792
[45] Date of Patent: Jan. 28, 1992

[54] LOADING AND EJECTING MECHANISM FOR MAGNETIC TAPE CASSETTE APPARATUS WITH TAPE TRANSPORT SHIFTING MECHANISM

[75] Inventor: Takao Watanabe, Kamagaya, Japan

[73] Assignee: Teac Corporation, Tokyo, Japan

[21] Appl. No.: 514,515

[22] Filed: Apr. 25, 1990

[30] Foreign Application Priority Data

Apr. 28, 1989 [JP] Japan .................. 1-111051
Apr. 28, 1989 [JP] Japan .................. 1-111052
Apr. 28, 1989 [JP] Japan .................. 1-111053
Apr. 28, 1989 [JP] Japan .................. 1-111054

[51] Int. Cl.$^5$ ............................ G11B 15/24
[52] U.S. Cl. ...................... 360/96.5; 360/93; 360/71
[58] Field of Search .......... 360/71, 72.3, 88, 90, 360/93, 96.1, 96.3, 96.5

[56] References Cited

U.S. PATENT DOCUMENTS 4,701,817 10/1987 Uemura ............................. 360/96.5

*Primary Examiner*—John H. Wolff
*Assistant Examiner*—Craig A. Renner
*Attorney, Agent, or Firm*—Woodcock Washburn Kurtz Mackiewicz & Norris

[57] ABSTRACT

A magnetic tape cassette apparatus of the type requiring no movement of a transducer for the establishment of data transfer contact with the tape cassette. Inserted lengthwise in the apparatus, the tape cassette has its apertured front side oriented toward the fixed transducer. A cassette shift mechanism subsequently transports the tape cassette in its own plane into data transfer contact with the transducer. Then the pair of drive spindles of a tape transport are moved axially into driving engagement with the tape cassette by a tape transport shift mechanism. For simplifying the construction of this tape transport shift mechanism, an electric drive motor is provided. The controlled rotation of the drive motor is translated into the linear movement of the drive spindles into or out of driving engagement with the tape cassette. Preferably, the drive spindles may be sprung into driving engagement with the tape cassette in order to preclude the danger of overloading the drive motor when a tape cassette of wrong size or type is inserted in the apparatus.

6 Claims, 12 Drawing Sheets

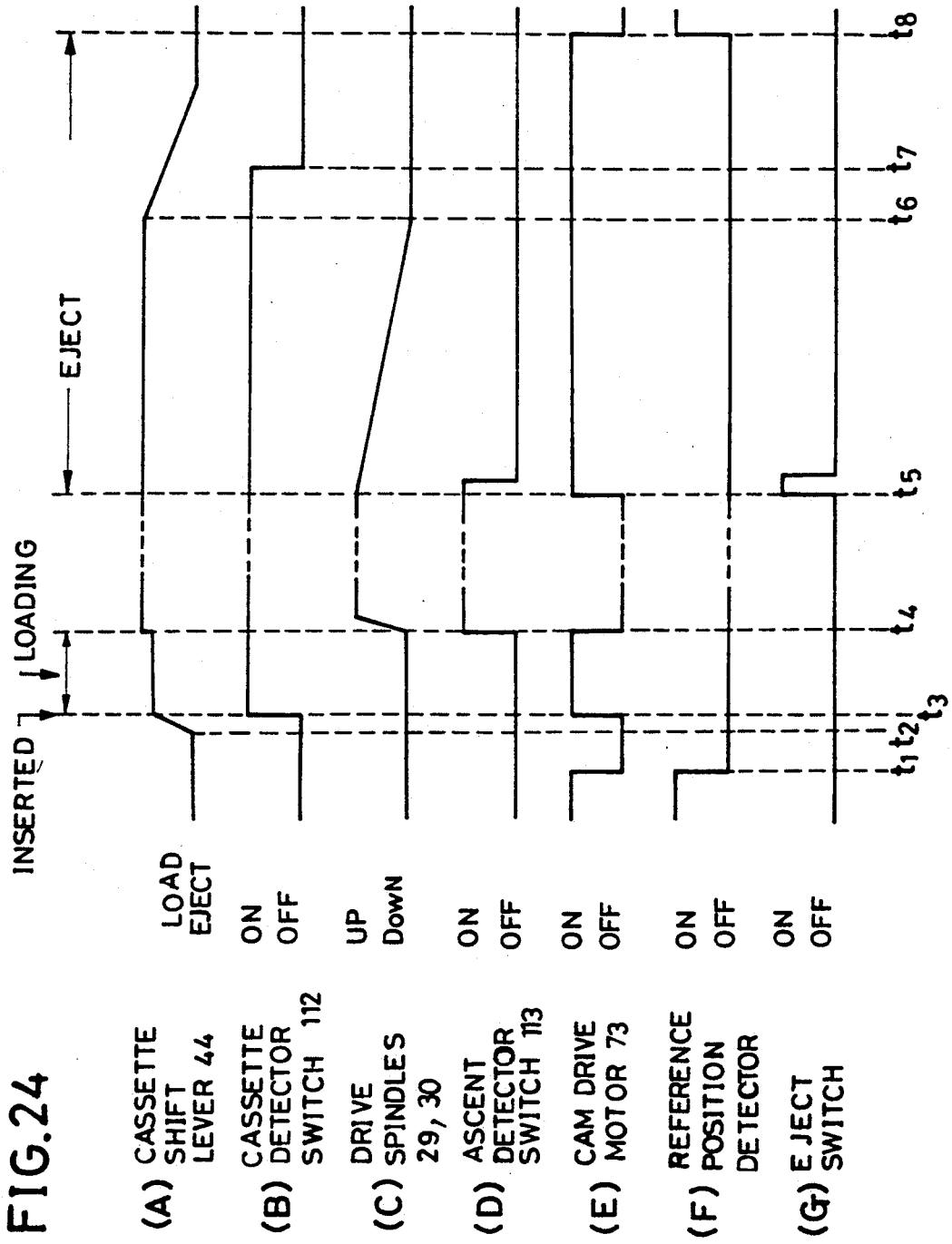

LOADING AND EJECTING MECHANISM FOR MAGNETIC TAPE CASSETTE APPARATUS WITH TAPE TRANSPORT SHIFTING MECHANISM

BACKGROUND OF THE INVENTION

My invention relates to an apparatus for the recording and/or reproduction of information, particularly digitized information, on magnetic tape packaged in cassette form. More particularly, my invention pertains to means in such an apparatus for loading and unloading the tape cassette to and from a preassigned position for data transfer with the transducer or head.

Generally, in magnetic tape cassette apparatus, it is essential that the tape cassette on being loaded therein be precisely positioned with respect to the transducer for proper data transfer therewith. Some prior art devices have had difficulties in meeting this requirement. The difficulties have arisen in such devices because not only the tape cassette but also the transducer has had to be moved for the establishment of data transfer contact therebetween. The tape cassette on being inserted in the entrance slot of the apparatus has been first moved to the data transfer position. Then the transducer has been moved into engagement with the tape of the tape cassette.

Uemura U.S. Pat. No 4,701,817 represents a solution to the above problem. This patent makes the movement of the transducer unnecessary; only the tape cassette, on being inserted fully in the entrance slot, is moved linearly to the data transfer position opposite the transducer. Then the pair of motor-driven spindles, forming parts of a tape transport, are thrust into driving engagement with the hubs of the tape cassette for tape transportation therebetween. The movement of the tape cassette to the data transfer position and that of the drive spindles into driving engagement with the cassette hubs are both automatic. Such movements successively take place under spring forces upon insertion of the tape cassette in the apparatus.

For ejection, the operator is to press a push button on the front face of the apparatus. Then the drive spindles will retract out of driving engagement with the cassette hubs. Then the tape cassette will retract away from the transducer and will be ejected through the entrance slot.

Although this prior art apparatus is well calculated for the establishment of proper positional relationship between transducer and tape cassette, I have found certain shortcomings that must be overcome for the enhancement of its practical utility.

In the prior art apparatus, the tape cassette on full insertion therein is sprung into data transfer contact with the transducer. The drive spindles are also sprung into driving engagement with the tape cassette. For ejection, too, purely mechanical means have been provided for retracting the drive spindles out of driving engagement with the tape cassette in response to the depression of the push button and then for ejecting the tape cassette from the apparatus. The prior art apparatus has therefore been very complex in construction, and the exertion of a considerable manual force has been required for the ejection of the tape cassette.

SUMMARY OF THE INVENTION

I have hereby invented how to simplify the construction of the prior art tape cassette apparatus of the kind defined. I have also discovered how to make the apparatus more positive and reliable in operation and how to make it free from trouble in use.

Briefly, my invention may be summarized as an apparatus for data transfer with a tape cassette of the type having a generally flat boxlike housing accommodating a length of tape for transportation between a pair of hubs mounted within the housing for independent rotation about respective axes disposed in parallel spaced relationship with each other, the tape being exposed through an aperture in a predetermined front side of the housing extending parallel to a notional line right angularly intersecting the axes of rotation of the hubs.

More specifically, the tape cassette apparatus according to my invention comprises a casing having defined therein an entrance slot or like opening in which the tape cassette is to be inserted lengthwise, that is, in the direction of the notional line. The tape cassette upon full insertion in the entrance slot comes to a preassigned retracted position opposite a transducer. Cassette shift means is provided for reciprocably moving the tape cassette relative to the casing in the principal plane of the cassette and in a direction normal to the notional line between the retracted position and a preassigned working position, where the tape cassette has its tape in data transfer contact with the transducer through the apertured front side of the cassette housing.

My invention is perhaps best characterized by tape transport shift means for moving a pair of drive spindles, constituting parts of a tape transport, into and out of driving engagement with the hubs of the tape cassette lying in the working position. An electric drive motor is provided toward this end. The tape transport shift means comprises cam means for translating the rotation of the drive motor into at least either of the linear movement of the drive spindles into driving engagement with the cassette hubs and the linear movement of the drive spindles out of driving engagement with the cassette hubs.

Thus, according to my invention, the drive spindles are motor driven for movement at least into, or out of, driving engagement with the cassette hubs. This feature makes the apparatus materially simpler in mechanical construction, and easier of use, than heretofore.

In a preferred embodiment of my invention the transport shift means comprises a rotary drive cam coupled to the motor. The drive cam makes it possible to move the drive spindles into and out of driving engagement with the cassette hubs in exactly timed relation to the travel of the tape cassette between the retracted and working positions.

According to a further feature of my invention the drive cam is automatically initialized in a preassigned angular position when the apparatus is electrically turned on. The tape cassette may therefore be readily loaded in the apparatus after it has been powered on. There is absolutely no possibility of the drive spindles being left unretracted and so interfering with the travel of the tape cassette toward the working position. The apparatus is also designed for freedom from trouble when a tape cassette of wrong size or type or the like is inserted by mistake.

The above and other features and advantages of my invention and the manner of realizing them will become more apparent, and the invention itself will best be understood, from a study of the following description and appended claims, with reference had to the attached drawings showing a preferred embodiment of my invention.

BRIEF DESCRIPTION OF THE DRAWINGS

FIG. 24 is a timing chart explanatory of the operation of the apparatus.

DESCRIPTION OF THE PREFERRED EMBODIMENT

General

Figure 1:
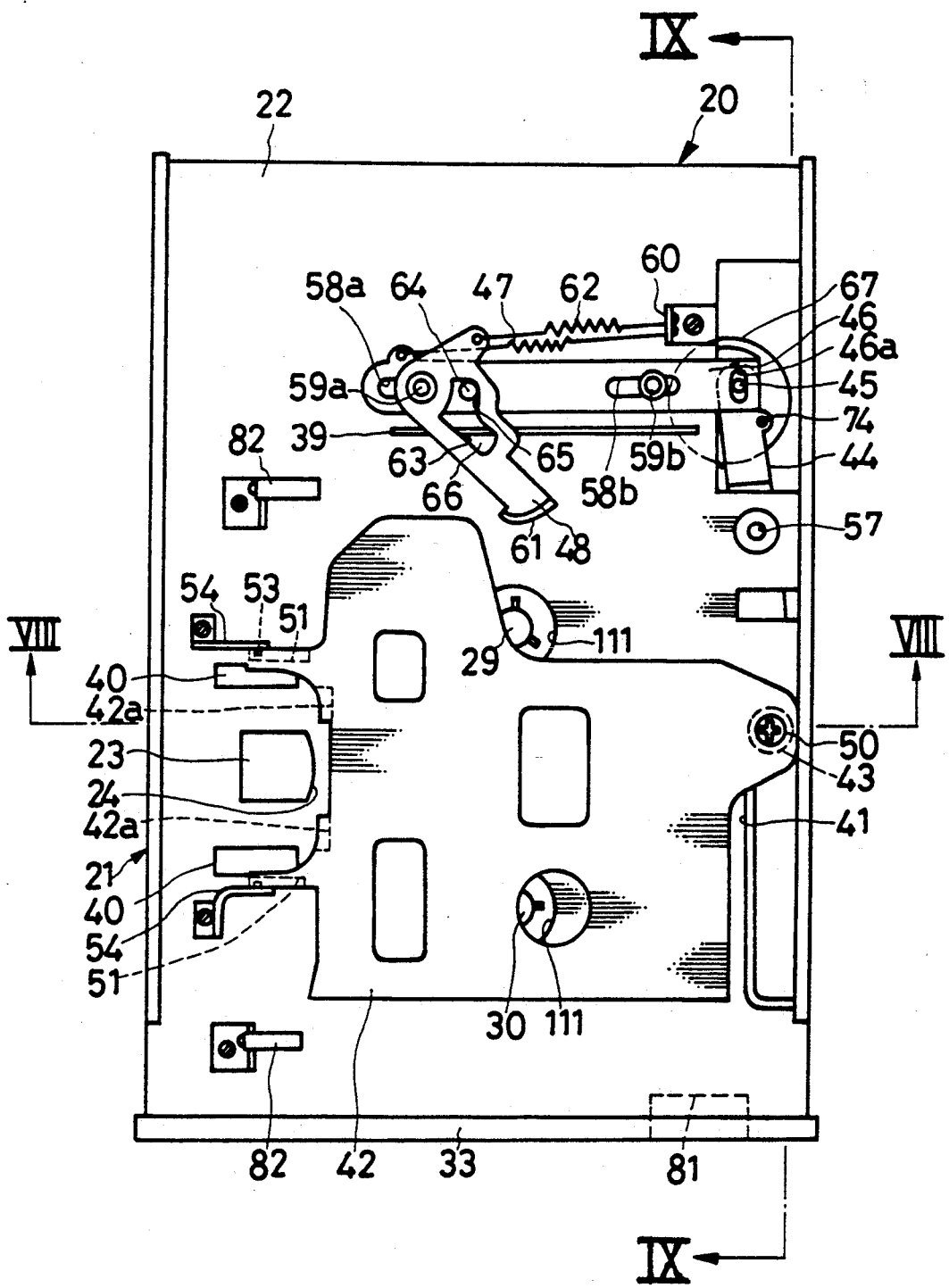
FIG. 1 is a horizontal section through the tape cassette apparatus constructed in accordance with my invention, showing in particular the cassette shift mechanism in a state for the insertion, or ejection, of the tape cassette which is not shown here.

The above drawings illustrate the apparatus of my invention as adapted for the writing and reading of digital data on a multitrack tape cassette. As will be seen from both FIGS. 1 and 2, the illustrated tape cassette apparatus 20 has a boxlike casing 21 with a baseplate 22 immovably mounted therein. An electromagnetic data transducer or head 23 is mounted to the baseplate 22 with its gapped data transfer surface 24 oriented to the right as viewed in FIG. 1. The apparatus 20 requires no movement of the transducer 23 toward and away from the loaded tape cassette, so that the transducer is held fast against movement in a direction normal to a plane tangent to its curved data transfer surface 24. However, in this particular embodiment, which is intended for use with multitrack tape cassettes as aforesaid, the transducer 23 is movable in the width direction of the magnetic tape, not shown, to be held against its data transfer surface 24.

Figure 2:
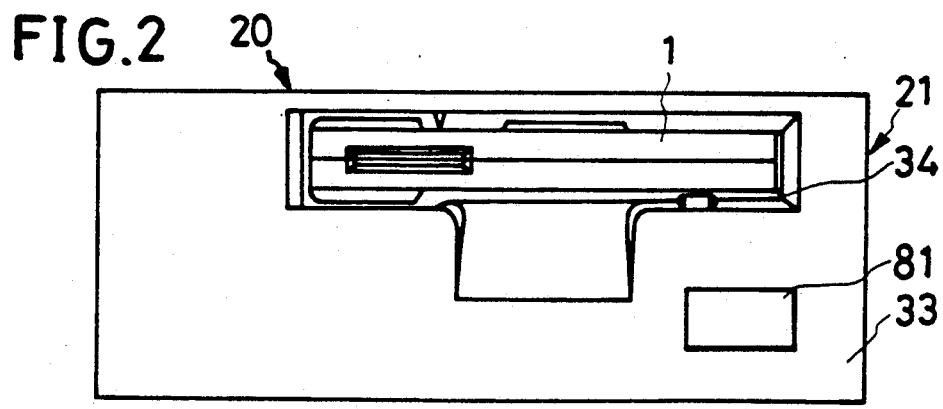
FIG. 2 is a front elevation of the tape cassette apparatus.

At 34 in FIG. 2 is seen an entrance slot or opening 34 formed in the front face 33 of the casing 21. The multitrack magnetic tape cassette 1 is to be loaded in, and ejected from, the apparatus 20 through this entrance slot 34.

FIG. 2 also depicts the normal attitude in which the tape cassette apparatus 20 is intended for use. The casing 21 is to be placed recumbently, rather than upstandingly, with its front face 33 directed toward the user. Therefore, in the following description, I will use directional terms such as "upward" and "downward", "horizontal" and "vertical", as well as derivatives thereof, with this recumbent attitude of the casing 21 in mind. Thus, for instance, the transducer 23 is locked against movement in any horizontal direction but is movable vertically, or both upward and downward, within limits.

Figure 3:
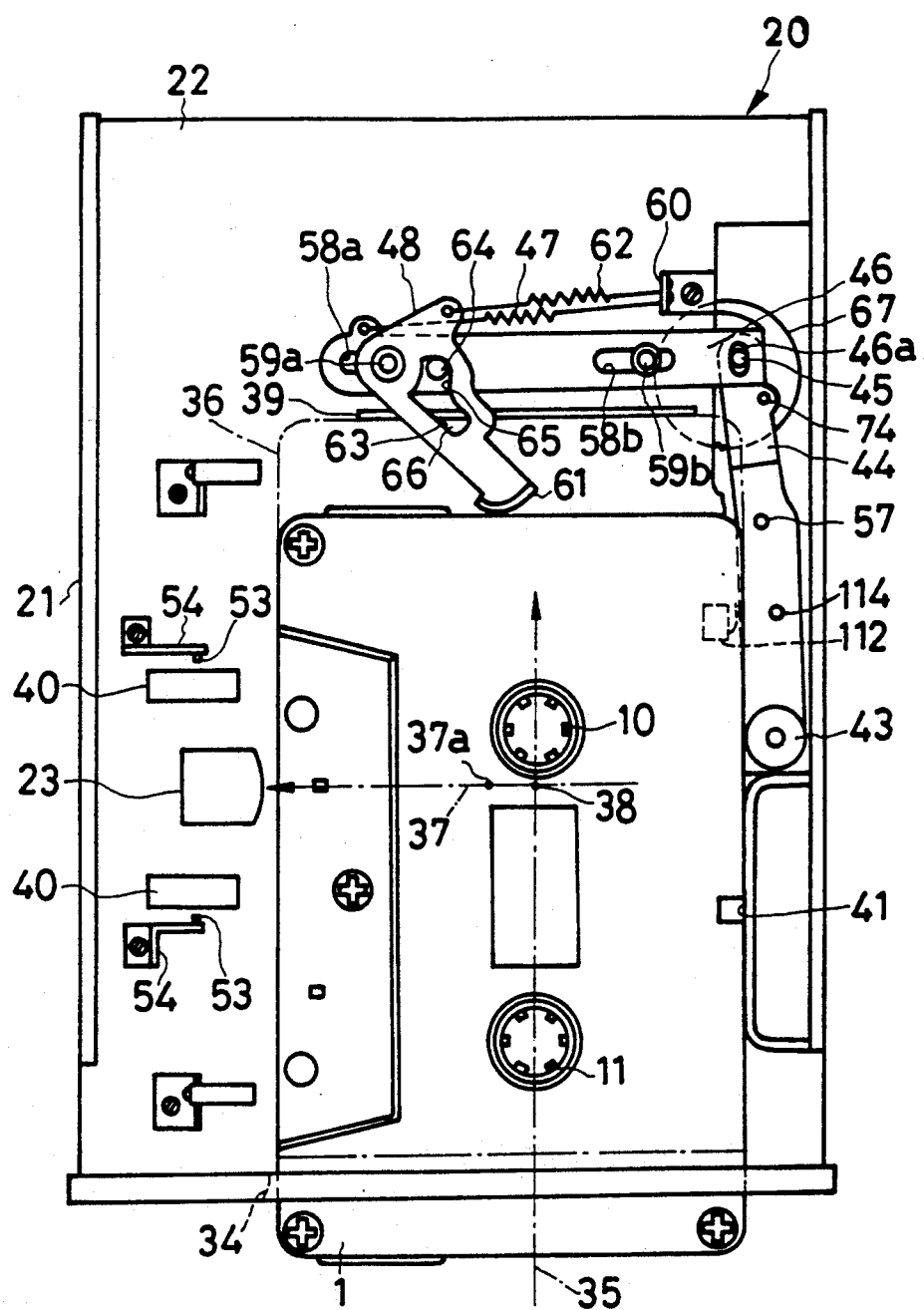
FIG. 3 is a view similar to FIG. 1 but showing the tape cassette being inserted in the apparatus.

Inserted in the entrance slot 34 along a notional horizontal line 35 in FIG. 3, the tape cassette 1 will travel past the solid-line intermediate position to the phantom position designated 36 in the same drawing. A cassette loading mechanism transports the tape cassette 1 from this phantom position to the solid-line position of FIG. 4 along a second notional horizontal line 37 at right angles with the first recited line 35. The tape cassette 1 is loaded against the transducer 23 in this solid-line position, with its magnetic tape 9 held against the transducer for data transfer.

The noted phantom position of the tape cassette 1 indicated in FIG. 3 is what I call its retracted position, where the cassette is away from the transducer 23. The solid-line position of FIG. 4, then, is the working position where the cassette is in data transfer contact with the transducer 23. It will be appreciated that the cassette on being inserted in the entrance slot 34 travels in one and the same plane into data transfer contact with the transducer.

Figure 4:
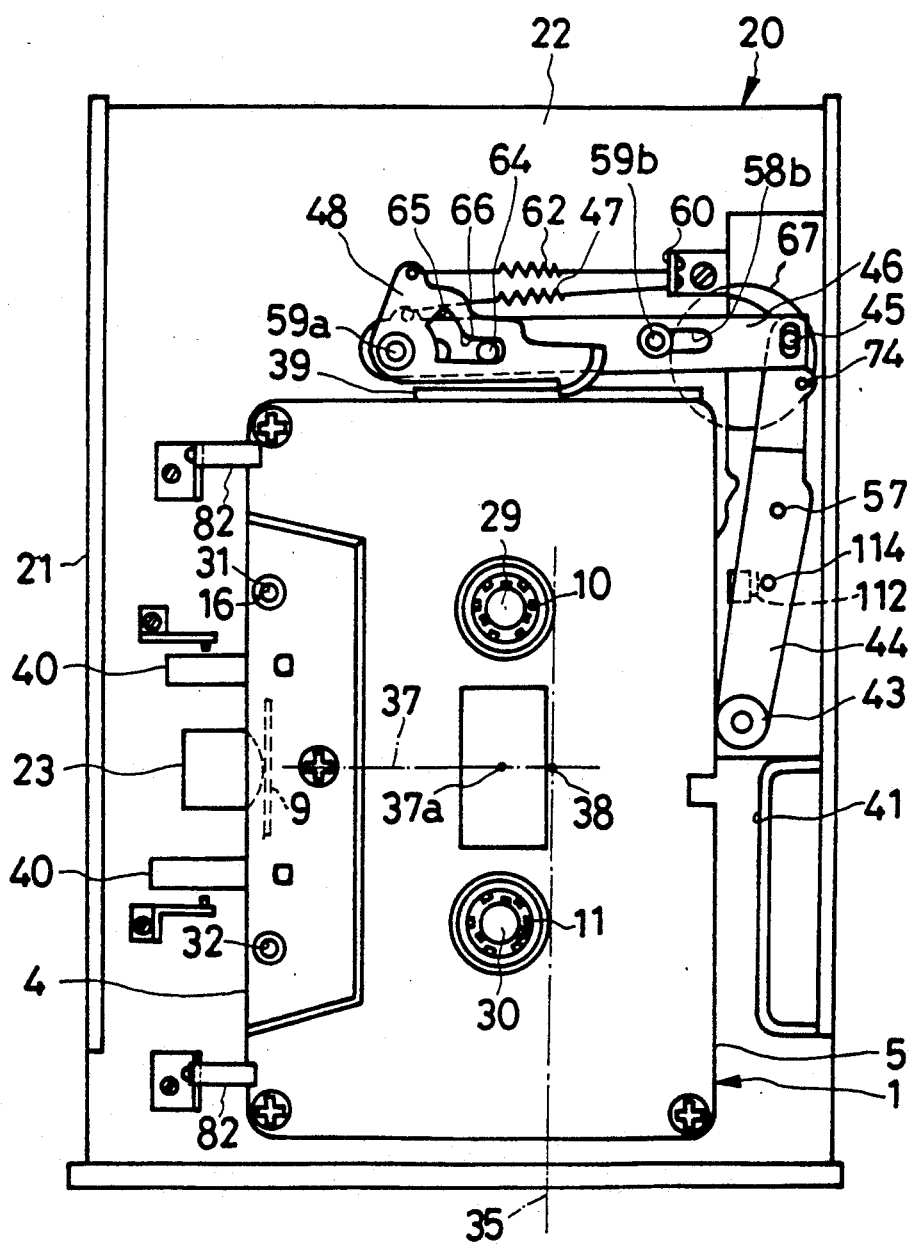
FIG. 4 is a view similar to FIG. 3 except that the tape cassette is shown shifted to the working position within the apparatus.

The point 38 of intersection of the two right angular horizontal lines 35 and 37 in FIGS. 3 and 4 also represents the geometrical center (midpoint between the pair of hubs 10 and 11) of the tape cassette 1 when the latter is in the phantom retracted position of FIG. 3. The center of the cassette in the solid-line working position of FIG. 4 is at a point 37a that is slightly spaced to the left from the point 38 along the line. 37. The cassette is required to travel this minimal distance from its retracted to its working position.

FIGS. 1, 3 and 4 show at 39 a combined stop-guide structure erected on the baseplate 22 for arresting the travel of the tape cassette 1 in the retracted position on being inserted in the entrance slot 34. Further the cassette is to travel along this stop-guide structure from the retracted to the working position. A pair of limit stops 40 on the baseplate 22 stops the cassette in the working position. A guide 41 on the baseplate 22 guides the travel of the cassette to the retracted position on being inserted in the entrance slot 34.

A tape transport mechanism including a pair of motor-driven spindles 29 and 30, FIG. 1, is held retracted under the path of the tape cassette 1 during its travel from the retracted and the working position. When the cassette arrives at the working position, a tape transport shift mechanism operates to raise the tape transport mechanism into driving engagement with the cassette.

The illustrated tape cassette apparatus 20 further comprises an ejector mechanism including an eject pushbutton 81, FIG. 2, for ejecting the tape cassette 1, and a track selector mechanism for the transducer 23 to make selective use of the data tracks of the cassette. The ejector mechanism moves the cassette from the phantom retracted position of FIG. 3 back to the solid-line position of the same figure, in which the cassette partly projects out of the entrance slot 34 in the front face of the casing 21. However, no clear distinction can possibly be made between the parts making up the cassette loading mechanism and those constituting the ejector mechanism, so that I will collectively refer to them as the cassette loading and ejecting mechanism. The track selector mechanism can be of known construction and is disclosed, for example, in the above cross-referenced Uemura U.S. Pat. No. 4,701,817.

I will discuss in more detail hereafter the above mentioned tape cassette, the tape transport mechanism, the cassette loading and ejecting mechanism, and the tape transport shift mechanism, in that order and under the respective headings. The operational description of the complete apparatus will follow the detailed discussion of its listed component mechanisms.

Tape Cassette

Figure 5:
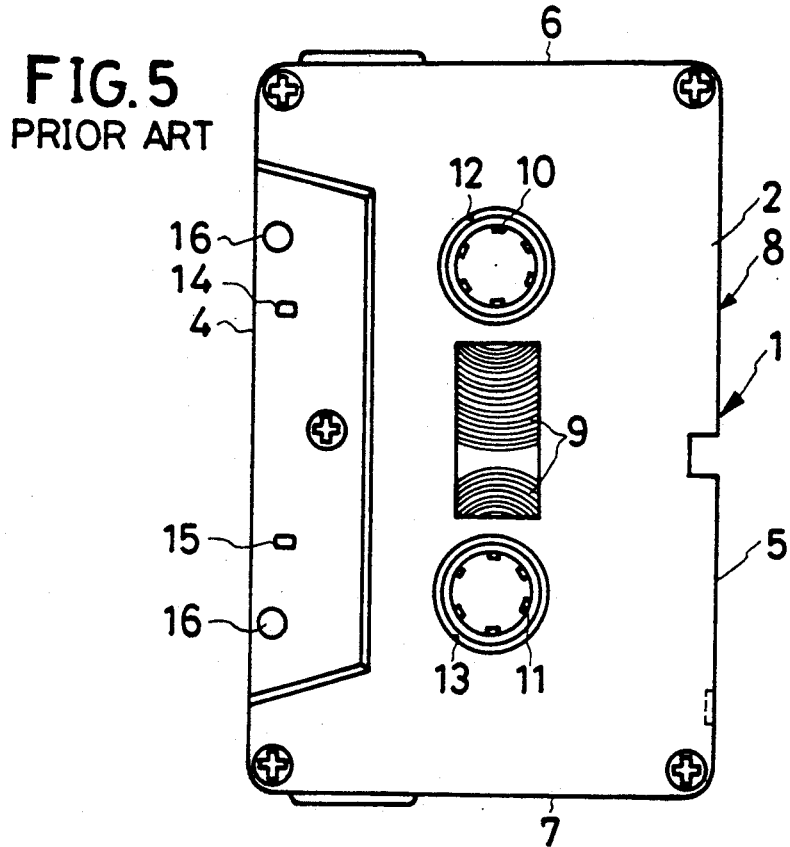
FIG. 5 is a plan view of the tape cassette for use with the apparatus of FIG. 1.
Figure 6:
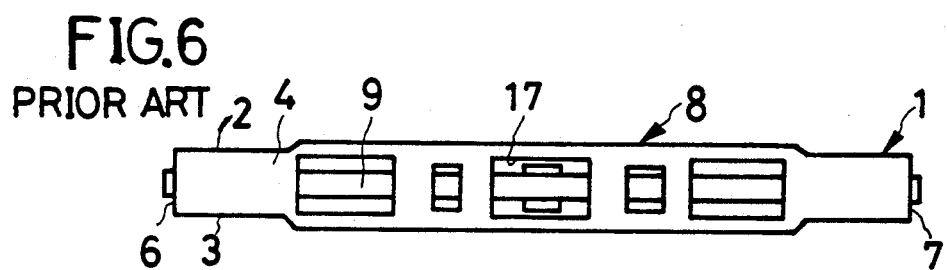
FIG. 6 is a front elevation of the tape cassette.

With reference to both FIGS. 5 and 6 the tape cassette 1 for use with the apparatus 20 of my invention can be of the standard design having a generally flat, boxlike housing 8. This cassette housing has a pair of opposite main faces 2 and 3, a front side 4, a rear side 5 away from the front side, and a pair of lateral sides 6 and 7. Disposed within the housing are a pair of rotatable hubs or reels 10 and 11 having internal teeth for positive engagement with the noted pair of drive spindles 29 and 30, FIG. 1, of the apparatus 20. The toothed hubs 10 and 11 are exposed through aligned pairs of openings 12 and 13 in the man faces 2 and 3 of the cassette housing 8. A length of magnetic tape 9 has its opposite ends anchored to the hubs 10 and 11 and is wound thereon for transportation therebetween.

The cassette housing 8 has a series of windows 17 formed in its front side 4 to partly expose the magnetic tape 9 as it extends between the pair of hubs 10 and 11. The central one of the windows 17 is intended for the establishment of data transfer contact between tape 9 and transducer 23.

Further the cassette housing 8 has formed in its main faces 2 and 3 two pairs of aligned holes 14 and 15 and two other pairs of aligned holes 16. The holes 14 and 15 have been used for insertion of the capstan found in the familiar capstan drive cassette players or decks. However, the illustrated apparatus 20 employs a different principle of tape speed control. The holes 14 and 15 are utilized by the apparatus 20 for the insertion of light sources for photoelectrically sensing the beginning and end (BOT and EOT) of the magnetic tape 9. The other pairs of aligned holes 16 are for insertion of tape guide pins seen at 31 and 32 in FIG. 4.

Tape Transport Mechanism

Figure 7:
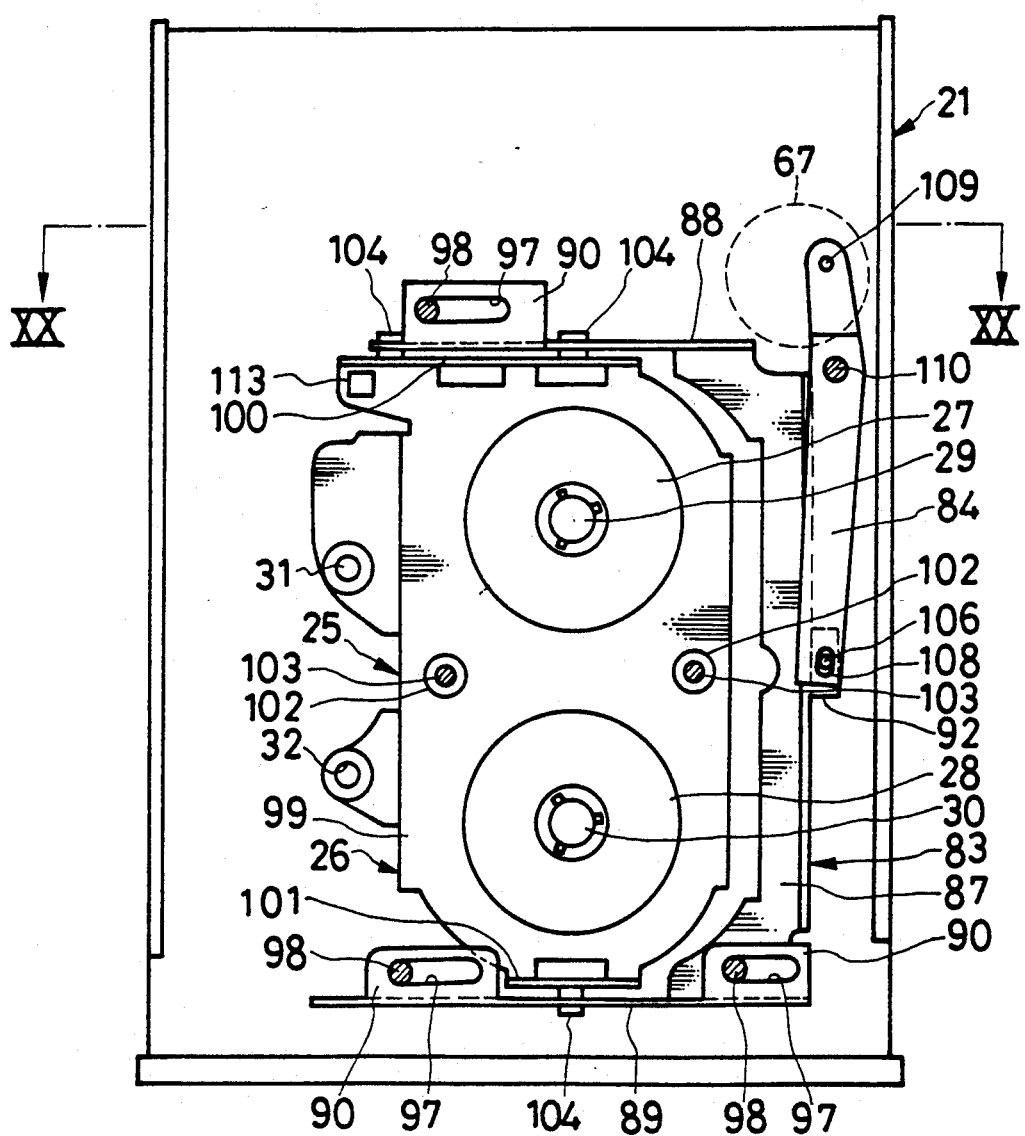
FIG. 7 is another horizontal section through the tape cassette apparatus, showing in particular the tape transport mechanism.

The tape transport mechanism is best ilustrated in FIG. 7 which reveals the means under the baseplate 22 of the apparatus 20 by removing the baseplate together with the various means mounted thereon. Generally designated 25, the tape transport mechanism comprises a pair of bidirectional electric drive motors 27 and 28 mounted to a generally flat tape transport carriage 26 laid parallel to the baseplate 22. The drive motors 27 and 28 have the noted pair of drive spindles 29 and 30 coupled directly thereto and extending upwardly therefrom. The tape transport carriage 26 has also mounted thereon the pair of upstanding guide pins 31 and 32.

The tape transport carriage 26 is to be moved up and down with respect to the fixed baseplate 22 by the tape transport shift mechanism to be detailed subsequently. Such up and down travel of the tape transport carriage 26 results in the movement of the drive spindles 29 and 30 into and out of driving engagement with the hubs 10 and 11, FIG. 5, of the tape cassette 1 being held in the working position of FIG. 4. The baseplate 22 is apertured at 111, FIG. 1, to permit such movement of the drive spindles 29 and 30 into and out of engagement with the cassette hubs 10 and 11. Of course, the tape transport mechanism 25 is held retracted when the tape cassette 1 is in other than the data transfer position. The pair of guide pins 31 and 32 also travel into and out of engagement in the holes in the cassette housing 8 with the up and down movement of the tape transport carriage 26.

The tape transport mechanism 25 does not have the conventional capstan and pinch roller for tape speed control. This apparatus employs, instead, a tape speed control servomechanism of the type described and claimed in Sakai U.S. Pat. No. 4,163,532. However, the fundamental concepts of my invention are applicable to tape cassette apparatus having the conventional tape speed control system.

Cassette Loading and Ejecting Mechanism

Figure 8:
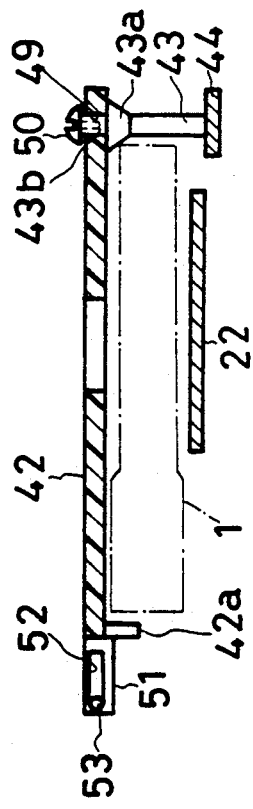
FIG. 8 is a vertical section through the apparatus, taken along the line VIII—VIII in FIG. 1.
Figure 9:
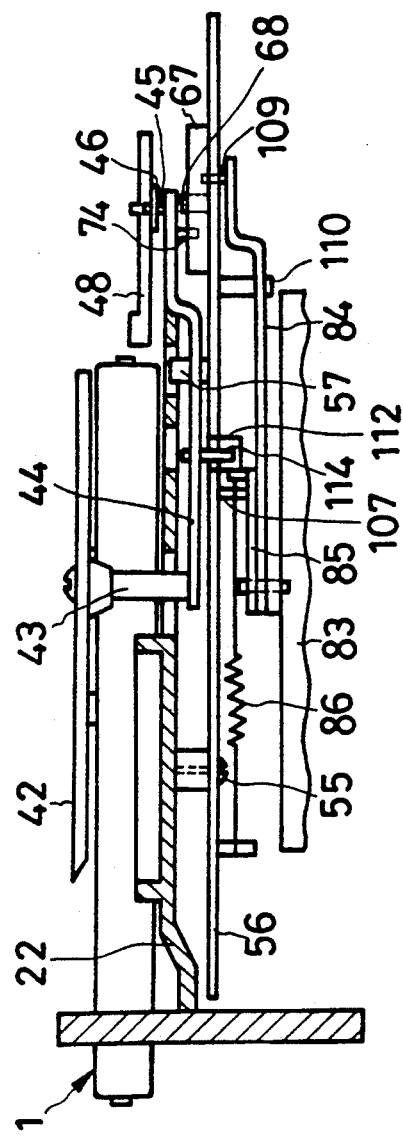
FIG. 9 is another vertical section through the apparatus, taken along the line IX—IX in FIG. 1.

The cassette loading and ejecting mechanism includes a generally flat cassette carriage 42 which is shown in top plan in FIG. 1, in vertical section in FIG. 8, and in side elevation in FIG. 9. The cassette carriage 42 is disposed to overlie the tape cassette 1 when the latter is inserted through the entrance slot 34 to the phantom retracted position of FIG. 3. Receiving and engaging the inserted cassette, the cassette carriage 42 travels therewith between this retracted position and the solid-line working position of FIG. 4.

For such linear travel between the two required positions, the cassette carriage 42 has a pair of fingers 51 with guide grooves 52 formed therein. The guide grooves 52 slidably receive guide pins 53 mounted to the baseplate 22 via supports 54.

As shown in both FIGS. 1 and 8, the cassette carriage 42 has a pair of lugs 42a depending from its left hand edge. These lugs engage the apertured front side 4, FIG. 5, of the tape cassette 1 in order to cause retraction of the cassette with the cassette carriage 42.

Figure 13:
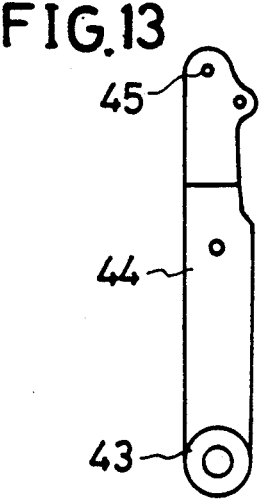
FIG. 13 is a plan view of the cassette shift lever.

For the movement of the tape cassette 1 with the cassette carriage 42 from the retracted to the working position, on the other hand, a push pin 43 is coupled to the right hand edge of the cassette carriage 42. Erected on a cassette shift lever 44 shown in FIG. 13, the push pin 43 functions both to transmit motion to the cassette carriage 42 for the required movement of the tape cassette 1 between the retracted and the working position and itself to push the cassette for its movement from the retracted to the working position.

As best illustrated in FIG. 8, the push pin 43 has a head 43a in the shape of an inverted cone positioned just under the cassette carriage 42. The head 43a has a hollow, internally threaded, upward extension 43b rotatably received in a hole 49 in the cassette carriage 42. A screw 50 is engaged in the tapped hole in the push pin extension 43b in order to prevent detachment of the cassette carriage 42 from the push pin 43. The head 43a is to butt on the tape cassette 1 for pushing the same from the retracted to the working position.

Figure 11:
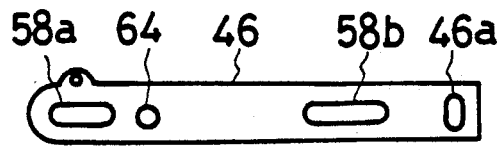
FIG. 11 is a plan view of the reciprocator also forming a part of the cassette loading and ejecting mechanism of the apparatus.
Figure 12:
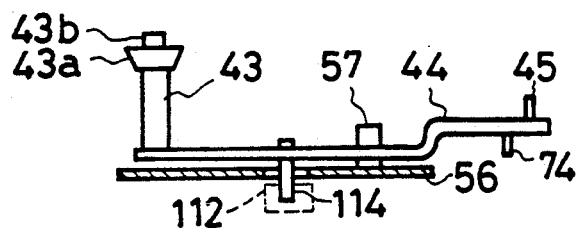
FIG. 12 is a side elevation of the cassette shift lever also forming a part of the cassette loading and ejecting mechanism of the apparatus.

FIGS. 9 and 12 indicate that the cassette shift lever 44, having the push pin 43 mounted on one end thereof, is medially supported on an upstanding pivot pin 57. This pivot pin is erected on a subbase plate 56 screwed as at 55 to the underside of the baseplate 22. The cassette shift lever 44 carries a pin 45 on its other end. The pin 45 is loosely engaged in a relatively short slot 46a, FIGS. 1 and 3, formed in one end of an elongate reciprocator 46 extending in the direction of cassette travel between the retracted and the working position. As shown also in FIG. 11, the reciprocator 46 has two guide slots 58a and 58b slidably receiving fixed guided pins 59a and 59b on the baseplate 22. Thus the pivotal movement of the cassette shift lever 44 about the pivot pin 57 results in the longitudinal movement of the reciprocator 46, and vice versa.

A helical tension spring 47 acts between reciprocator 46 and spring retainer 60 on the baseplate 22, biasing the reciprocator to the right as viewed in FIGS. 1, 3 and 4. As the reciprocator 46 is thus sprung to the right, the cassette shift lever 44 is biased to turn in a clockwise direction, that is, in the direction for pushing the tape cassette 1 from the phantom retracted position of FIG. 3 to the solid-line working position of FIG. 4.

Figure 10:
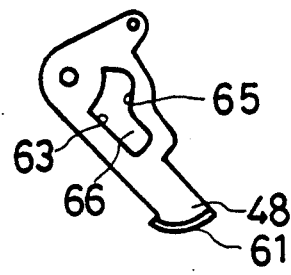
FIG. 10 is a plan view of the eject lever forming a part of the cassette loading and ejecting mechanism of the apparatus.

The noted guide pin 59a for the reciprocator 46 serves also as pivot for an eject lever 48. As shown also in FIG. 10, the eject lever 48 is a bell crank pivoted at the apex of the angle formed by its two arms. One of the arms of the eject lever 48 terminates in an abutment 61 to be abutted upon by the tape cassette 1 when the latter is being pushed into the entrance slot 34 toward the phantom retracted position of FIG. 3. The other arm of the eject lever 48 is engaged with one end of a helical tension spring 62, the other end of which is hooked to the noted spring retainer 60 on the baseplate 22. Therefore, when the tape cassette 1 is fully pushed in to the retracted position, the eject lever 48 is to be turned counterclockwise against the force of the tension spring 62 from its FIG. 3 position to that shown in FIG. 4 and is to remain in this position as long as the cassette stays in either the retracted or the working position.

The eject lever 48 has formed therein an approximately V-shaped cam slot 63 slidably receiving a cam follower pin 64 on the reciprocator 46. The cam slot 63 has an arcuate portion 65 and a straight portion 66.

Centered about the pivot 59a of the eject lever 48, the arcuate portion 65 receives the cam follower pin 64 when the eject lever 48 is turned clockwise to its FIGS. 1 and 3 position under the bias of the tension spring 62. The reciprocator 46 is then locked in its left hand position. Since then the cassette shift lever 44 is held pivoted counterclockwise, the cassette carriage 42 stays in the retracted position as in FIG. 1.

Upon full insertion of the tape cassette 1 in the entrance slot 34, the eject lever 48 is thereby pivoted counterclockwise from its FIGS. 1 and 3 position to that of FIG. 4 against the force of the tension spring 62. Then, as the cam follower pin 64 relatively slides into the straight portion 66 of the cam slot 63, the reciprocator 46 is moved to the right under the force of the tension spring 47. The result is the clockwise turn of the cassette shift lever 44 and, therefore, the travel of the tape cassette 1 from the retracted to the working position together with the cassette carriage 42.

Figure 14:
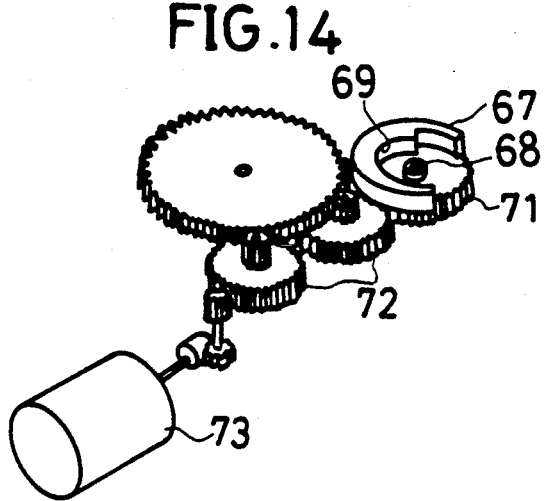
FIG. 14 is a perspective view of the drive cam, the electric drive motor, and a gear train through which the drive cam is driven by the motor.

Employed for the retraction of the tape cassette 1 is a disklike dual drive cam 67 disposed adjacent the cassette shift lever 44, as shown in FIGS. 1 and 3, for acting directly thereon. The dual drive cam 67 is so named because it is used for driving not only the cassette shift lever 44 but also the tape transport carriage 26. The dual drive cam 67 is rotatably mounted on a spindle 68, FIG. 9, on the subbase plate 56. It will be further noted from FIG. 14 that the dual drive cam 67 is peripherally toothed at 71 and is driven from a cam drive motor 73 via a train of gears 72.

Figure 15:
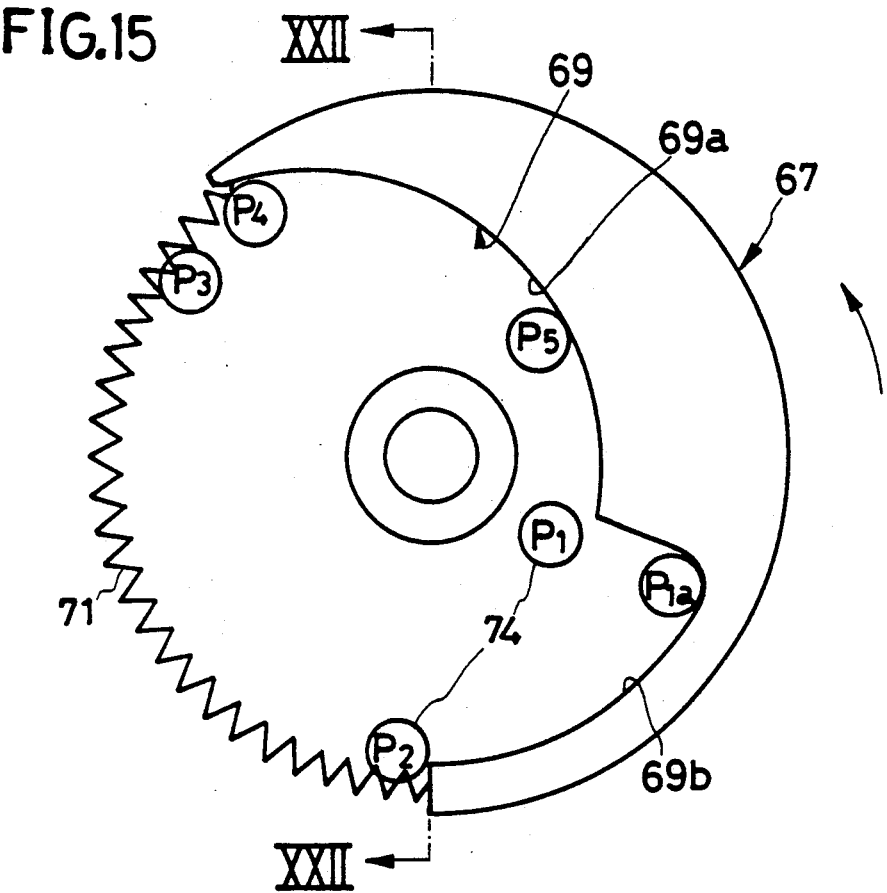
FIG. 15 is an enlarged plan view showing one face of the drive cam.
Figure 16:
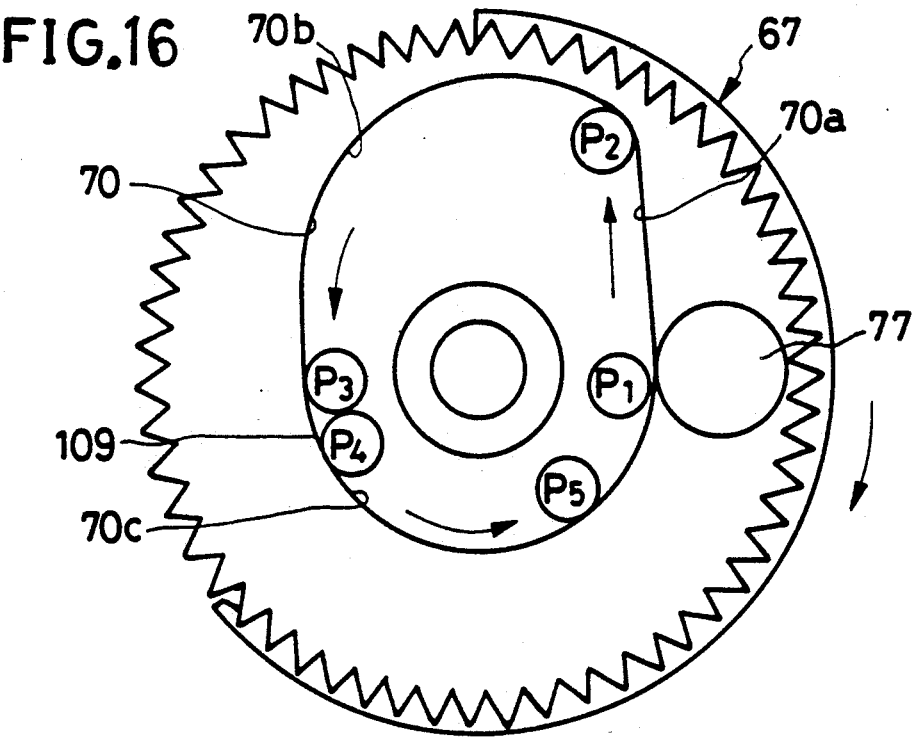
FIG. 16 is an enlarged plan view showing the other face of the drive cam.

FIGS. 15 and 16 are enlarged illustrations of the top and bottom faces, respectively, of the dual drive cam 67. The top face of the dual drive cam 67 has a contoured edge 69 for relative sliding contact with a cam follower pin 74 depending from the cassette shift lever 44, as best shown in FIG. 9. The indicia $P_1$–$P_5$ in FIG. 15 represent the positions to be successively occupied by the cam follower pin 74 on the top face of the dual drive cam 67 as the latter rotates in the arrow-marked direction. Reference will be had to these positions of the cam follower pin 74 in the subsequent description of operation. The bottom face of the dual drive cam 67 is associated with the tape transport shift mechanism to be detailed presently.

The contoured edge 69 of the dual drive cam 67 is broadly comprised of a first portion 69a gradually varying in distance from the center of the dual drive cam, and a second portion 69b at a constant, and generally greater, distance from the dual drive cam center. The cassette shift lever 44 is turned from its FIG. 4 position to that of FIGS. 1 and 3 as the cam follower pin 74 slides along the first portion 69a of the contoured edge 69. The second portion 69b of the contoured edge 69 is for permitting the cassette shift lever 44 to be turned from its FIGS. 1 and 3 position to that of FIG. 4.

Tape Transport Shift Mechanism

The tape transport shift mechanism appears in FIGS. 7, 9 and 17–21. It functions as aforesaid to raise the tape transport mechanism 25 into driving engagement with the tape cassette 1 when the latter is moved to the working position of FIG. 4 by the loading and ejecting mechanism of the foregoing construction.

The tape transport shift mechanism includes a tape transport shift cam 83 disposed under the subbase plate 56 as shown in FIG. 9. The tape transport shift cam 83 is movable back and forth along the notional line 37 of FIGS. 3 and 4 in order to cause the up and down travel of the tape transport mechanism 25.

Figure 17:
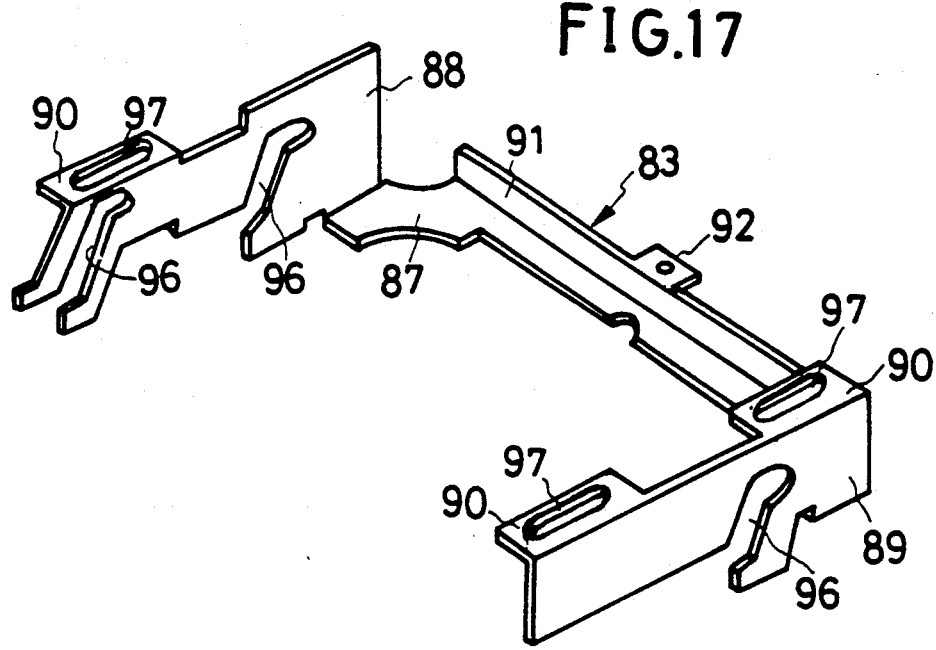
FIG. 17 is a perspective view of the tape transport shift cam forming a part of the tape transport shift mechanism.

As best pictured in FIG. 17, the tape transport shift member 83 is a one-piece construction of sheet metal comprising a pair of side portions 88 and 89 extending parallel to the notional line 37, and a connective portion 87 interconnecting the pair of side portions. The side portions 88 and 89 have three flaps 90 bent right-angularly from their top edges. The flaps 90 have guide slots 97 formed therein for slidably receiving fixed guide pins 98, FIG. 7, whereby the tape transport shift cam 83 is constrained to linear reciprocation along the notional line 37.

Figure 20:
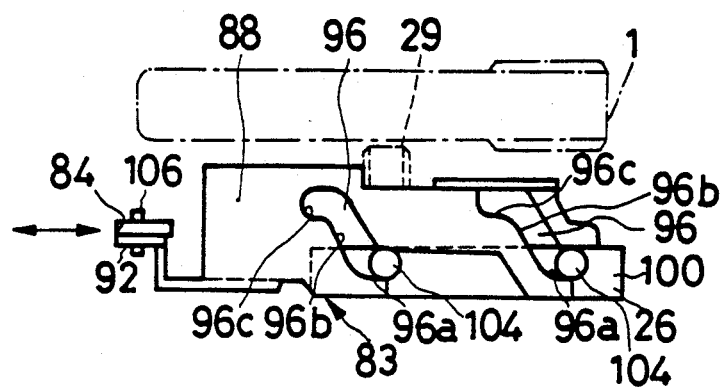
FIG. 20 is a side elevation of the tape transport shift mechanism taken along the line XX—XX in FIG. 7, the tape transport shift mechanism being shown in a state when the tape transport mechanism is lowered.
Figure 21:
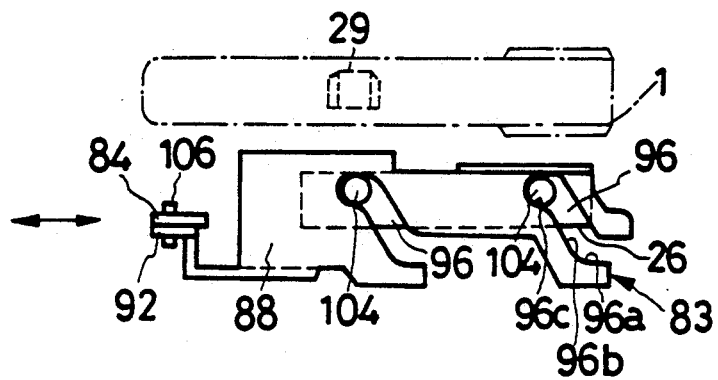
FIG. 21 is a view similar to FIG. 20 except that the tape transport mechanism is shown raised.

It will also be observed from FIG. 17 that the tape transport shift cam 83 has three cam slots 96, two of these in the side portion 88 and the other one in the other side portion 89. FIGS. 20 and 21 indicate that each cam slot 96 comprises a slanting portion 96b and two shorter horizontal portions 96a and 96c joined to the opposite ends of the slanting portion. These cam slots 96 slidably receive cam follower pins 104, as shown in FIGS. 20 and 21. The cam follower pins 104 are formed on a pair of side flanges 100 and 101, FIG. 7, at the opposite ends of a web 99 of the tape transport carriage 26. The web 99 of the tape transport carriage 26 has formed therein two guide holes 102 for slidably receiving upstanding guide pins 103 depending from the baseplate 22. Thus, with the horizontal reciprocation of the tape transport shift cam 83 along the notional line 37, the cam follower pins 104 slide up and down along the slanting portions 96b of the cam slots 96, resulting in the vertical reciprocation of the tape transport mechanism 25 into and out of driving engagement with the tape cassette 1 being held in the working position of FIG. 4.

Figure 18:
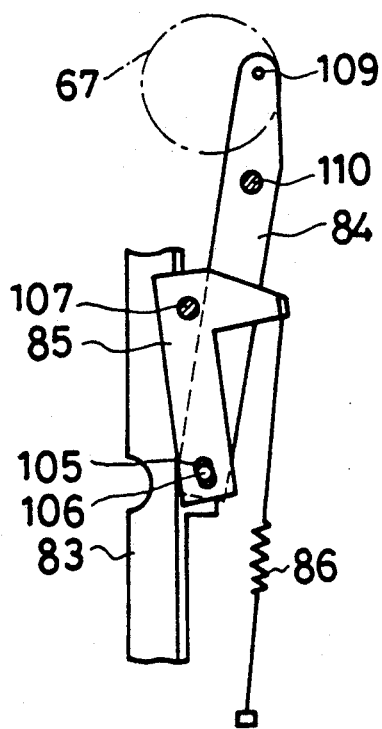
FIG. 18 is a partial plan view of the tape transport shift mechanism shown in a state when the tape transport mechanism is raised into driving engagement with the tape cassette.
Figure 19:
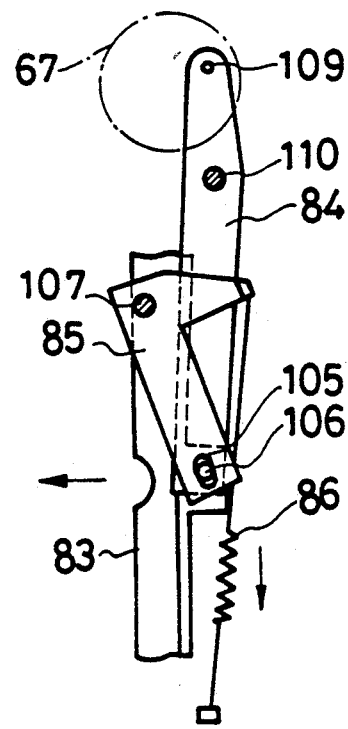
FIG. 19 is a view similar to FIG. 18 except that the tape transport shift mechanism is shown in a state when the tape transport mechanism is lowered out of driving engagement with the tape cassette.

Employed for the horizontal reciprocation of the tape transport shift cam 83 are a tape transport descent lever 84 and a tape transport ascent lever 85, FIGS. 9, 18 and 19, both disposed under the subbase plate 56. FIG. 7 shows only the tape transport descent lever 84, it being understood that the tape transport ascent lever 85, not shown here for illustrative convenience, is disposed over the descent lever. The descent lever 84 is medially supported by a pivot pin 110 depending from the subbase plate 56, for pivotal movement in a horizontal plane. One end of the descent lever 84 is slotted at 108 to loosely receive a pin 106 on a lug 92, FIG. 17, on a flange 91 of the connective portion 87 of the tape transport shift cam 83. The other end of the descent lever 84 has a cam follower pin 109 erected thereon for sliding engagement with the bottom face of the dual drive cam 67 shown in FIG. 16, as will be detailed presently. Thus the descent lever 84 functions to translate the rotation of the dual drive cam 67 into the linear horizontal travel of the tape transport shift cam 83 and, in consequence, in the vertical travel of the tape transport mechanism 25.

The tape transport ascent lever 85, on the other hand, is supported at one end on a pin 107 on the subbase plate 56 for pivotal movement in a horizontal plane. The other end of the ascent lever 85 is also slotted at 105 to loosely receive the noted pin 106 on the tape transport shift cam 83. A helical tension spring 86 biases the ascent lever 85 in a clockwise direction and so urges the tape transport shift cam 83 to the left, that is, toward the transducer 23.

Reference is now directed to FIG. 16 for a more detailed study of the bottom face configuration of the dual drive cam 67. In this drawing, too, as in FIG. 15, the indicia $P_1$-$P_5$ represent the various positions of the cam follower pin 109 on the tape transport descent lever 84 with respect to the bottom face of the dual drive cam 67. The same indicia $P_1$-$P_5$ are used in both FIGS. 15 and 16 because each of these represents the positions of the cam follower pins 74 and 109 when the dual drive cam 67 is in the same angular position. For example, when the cam follower pin 74 is in the position $P_1$ on the top face of the dual drive cam 67 in FIG. 15, the cam follower pin 109 is also in the position $P_1$ on the bottom face of the dual drive cam in FIG. 16.

The bottom face of the dual drive cam 67 has a contoured edge 70 for relative sliding engagement with the cam follower pin 109. The contoured edge 70 is broadly comprised of a straight portion 70a gradually increasing in distance from the center of the dual drive cam 67, a curved portion 70b gradually decreasing in distance from the dual drive cam center, and another curved portion 70c at a constant, minimum distance from the cam center.

OPERATION

The operational description of the tape cassette apparatus 20 will be subdivided under the headings of "Loading" and "Ejection". Additionally, since it is essential that the cassette loading and ejecting mechanism and the tape transport shift mechanism operate in timed relationship to each other, this subject will also be discussed under a separate subheading.

Loading

Figure 22:
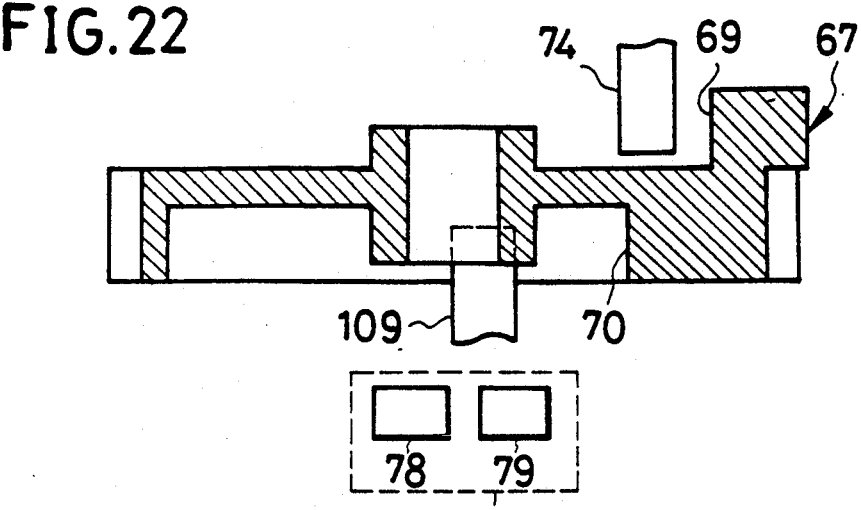
FIG. 22 is an axial section through the driven cam, taken along the line XXII—XXII in FIG. 15.
Figure 23:
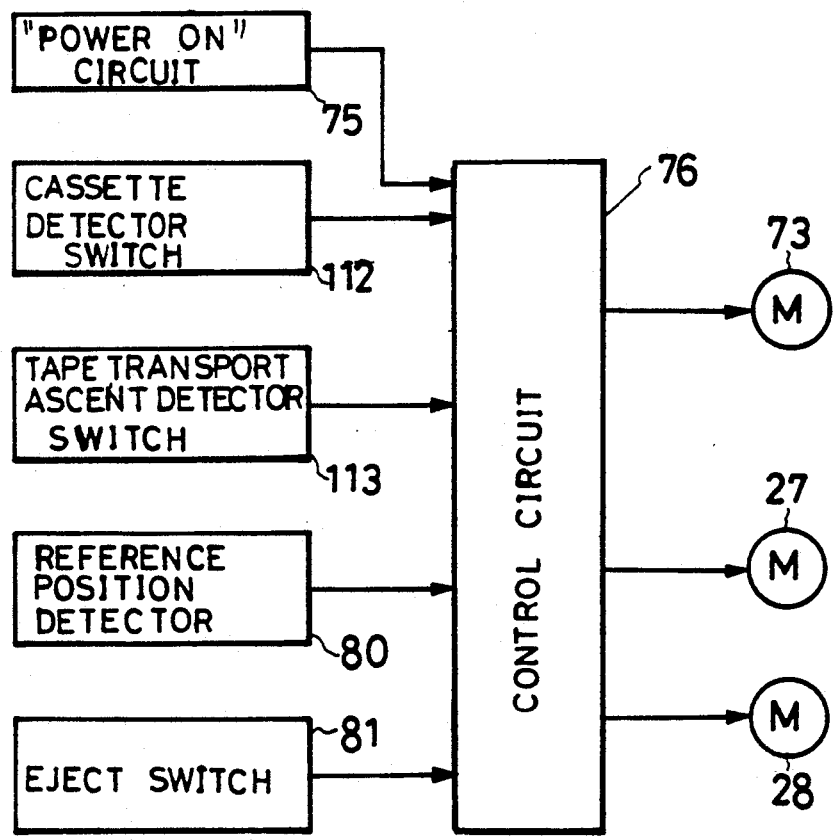
FIG. 23 is a block diagram of the electric control system of the apparatus.

When the tape cassette apparatus 20 is electrically turned on preparatory to the loading of the tape cassette 1, this fact is detected by a "power on" circuit 75 shown in FIG. 23. Then the dual drive cam 67 is initialized to the position $P_1$, FIGS. 15 and 16, by a control circuit 76 responsive to the output from the "power on" circuit 75. The dual drive cam 67 has a reflector 77, FIG. 16, on its bottom face in order to be so initialized by the control circuit 76. Associated with the reflector 77 is a cam position detector 80, FIG. 22, which is also connected to the control circuit 76 as shown in FIG. 23. The cam position detector 80 comprises a light source 78 for throwing a beam of light on the bottom face of the dual drive cam 67, and a photodetector 79 for detecting the reflection of the light beam from the reflector 77.

With the cam follower pin 74 initialized as above in the position $P_1$, FIG. 15, on the top face of the dual drive cam 67, the cassette shift lever 44 is in the position of FIGS. 1 and 3. The cassette carriage 42 is then held retracted away from the transducer 23.

The cam follower pin 109 on the tape transport descent lever 84 is also initialized in the position $P_1$, FIG. 16, on the bottom face of the dual drive cam 67. The descent lever 84 is then in the position of FIG. 19, holding the tape transport shift cam 83 away from the transducer 23. The tape transport mechanism 25 is thus held lowered as shown in FIG. 20.

Now the tape cassette 1 may be inserted in the entrance slot 34 in the front face 33 of the casing 21. Pushed fully to the phantom retracted position of FIG. 3, the tape cassette 1 will turn the eject lever 48 from its FIG. 3 position to that of FIG. 4 against the force of the tension spring 62. Then, with the cam follower pin 64 sliding into the straight portion 66 of the cam slot 63, the reciprocator 46 will travel from its FIG. 3 to FIG. 4 position under the influence of the tension spring 47 thereby turning the cassette shift lever 44 clockwise about the pivot 57. Then the push pin 43 on the cassette shift lever 44 will push the tape cassette 1 from the phantom retracted position of FIG. 3 to the solid-line working position of FIG. 4 together with the cassette carriage 42 shown in FIG. 1.

Thus moved to the working position, the tape cassette 1 will butt on the pair of limit stops 40 and will be retained in position by being resiliently held under the pair of cassette retainer springs 82. The transducer 23 is now in data transfer engagement with the magnetic tape 9 of the cassette 1.

It is understood that the dual drive cam 67 has been rotated to the position $P_2$ by the time the tape cassette 1 is moved to the working position. In this angular position the dual drive cam 67 permits the cam follower pin 109 on the tape transport descent lever 84 to travel radially outwardly of the cam. Therefore, as the tape transport ascent lever 85 turns clockwise from its FIG. 19 position to that of FIG. 18 under the bias of the tension spring 86, the tape transport shift cam 83 will travel to the left, as seen in FIGS. 18 and 19, with the consequent clockwise turn of the descent lever 84.

The tape transport shift cam 83 has thus been moved from its FIG. 20 to FIG. 21 position. It will be seen that the cam follower pins 104 on the tape transport carriage 26, initially positioned in the lower horizontal portions 96a of the cam slots 96, have relatively slid up their slanting portions 96b with such horizontal travel of the tape transport shift cam 83. Further, as shown in FIG. 21, the cam follower pins 104 have been caught in the upper horizontal portions 96c of the cam slots 96. The tape transport mechanism 25 will be thus raised for the driving engagement of its drive spindles 29 and 30 in the hubs 10 and 11 of the tape cassette 1 being held in the solid-line working position of FIG. 4. The guide pins 31 and 32 on the tape transport carriage 26 will also be engaged in the holes 16 in the cassette housing 8. The apparatus 20 is now ready for the commencement of data transfer with the tape cassette 1.

Ejection

The eject pushbutton 81, FIG. 2, on the front face of the casing 21 may be depressed for ejecting the tape cassette 1. In response to the actuation of the eject pushbutton switch the control circuit 76 of FIG. 23 will set the cam drive motor 23 into rotation. The dual drive cam 67 will be revolved from its position $P_2$ back to the position $P_1$ through the positions $P_3$, $P_4$ and $P_5$. The tape transport mechanism 25 must be retracted out of driving engagement with the tape cassette 1 prior to its retraction from the working position. Thus, as will be noted from FIG. 15, the cam follower pin 74 on the cassette shift lever 44 is not acted upon by the dual drive cam 67 during its revolution from position $P_2$ to position $P_4$, so that the cassette shift lever will stay in the FIG. 4 position, holding the tape cassette 1 in the working position.

However, as the cam follower pin 109 on the tape transport descent lever 84 slides along the curved portion 70b of the contoured edge 70 on the bottom face of the dual drive cam 67 from position $P_2$ to position $P_3$ in FIG. 16, the tape transport descent lever 84 will turn counterclockwise from its FIG. 18 to FIG. 19 position. Then the tape transport shift cam 83 will travel away from the transducer 23, with the counterclockwise turn of the tape transport ascent lever 85 against the force of the tension spring 86. Thus the tape transport mechanism 25 will descend from its FIG. 20 to FIG. 21 position.

Then, with the subsequent revolution of the dual drive cam 67 from position $P_4$ back to position $P_1$ in FIG. 15, the cam follower pin 74 on the cassette shift lever 44 will travel closer to the center of the cam by sliding along the curved portion 69a of the contoured edge 69 on the top face of the cam. The cassette shift lever 44 will then turn counterclockwise from its FIG. 4 to FIG. 3 position thereby shifting the tape cassette 1 from its working to retracted position together with the cassette carriage 42 shown in FIG. 1.

The cam follower pin 64 on the reciprocator 46 will enter the arcuate portion 65 of the cam slot 63 in the eject lever 48 upon retraction of the tape cassette 1. Then the eject lever 48 will turn counterclockwise from its FIG. 4 to FIG. 3 position under the bias of the tension spring 62, thereby ejecting the tape cassette 1 as indicated by the solid lines in FIG. 3.

Timing of Loading and Ejecting Mechanism and Tape Transport Shift Mechanism

The tape cassette apparatus 20 incorporates the following additional means for timing the operations of the cassette loading and ejecting mechanism and the tape transport shift mechanism: (1) a cassette detector switch 112, FIGS. 4 and 9, for detecting the insertion of the tape cassette 1 in the entrance slot 34; and (2) a tape transport ascent detector switch 113, FIG. 7, for detecting the ascent of the tape transport mechanism 25. As shown in FIG. 23, these detector switches 112 and 113 are both electrically connected to the control circuit 76, enabling the same to control the cam drive motor 73 in a manner to be set forth subsequently.

The cassette detector switch 112 is mounted fast on the subbase plate 56. The position of the cassette detector switch 112 is such that it is actuated by a pin 14 depending from the cassette shift lever 44 when the latter turns to the FIG. 4 position for shifting the tape cassette 1 to the working position. The tape transport ascent detector switch 113, on the other hand, is mounted fast on the underside of the baseplate 22. The switch 113 is to be actuated by the tape transport carriage 26 upon ascent of the tape transport mechanism 25 into driving engagement with the tape cassette 1.

Reference is now directed to the timing chart of FIG. 24. This timing chart is plotted on the assumption that the tape cassette apparatus 20 has been electrically powered on before a time $t_1$ but is not yet loaded with the tape cassette. Thus, at (E) in FIG. 24, the cam drive motor 73 is shown to be already in rotation for initialization of the dual drive cam 67. The "power on" circuit 75 will signal the control circuit 76 when the tape cassette apparatus 20 is electrically powered on. Then the control circuit 76 will respond by setting the cam drive motor 73 into rotation.

Then the control circuit 76 will stop the cam drive motor 73 when the cam position detector 80, FIG. 22, detects the reflector 77, FIG. 16, on the bottom face of the dual drive cam 67 at a time $t_1$. The dual drive cam 67 is thus initialized in the predetermined starting position $P_1$. Of course, if the dual drive cam 67 has been in the starting position $P_1$ when the apparatus is switched on, the control circuit 76 will hold the cam drive motor 73 at rest.

The tape cassette 1 may be inserted in the entrance slot 34 after the initialization of the dual drive cam 67. When the cassette comes to the phantom retracted position of FIG. 3 at a time $t_2$, the eject lever 48 will turn counterclockwise against the force of the tension spring 62. Then, at a time $t_3$, the cassette shift lever 44 will rapidly turn clockwise to its FIG. 4 position under the force of the other tension spring 47 thereby pushing the cassette toward the working position.

Since the dual drive cam 67 is now at rest, the cam follower pin 74 on the cassette shift lever 44 will travel radially outwardly of the cam from position $P_1$ to position $P_{1a}$, FIG. 15, on the top face of the cam 67 with such clockwise turn of the cassette shift lever. The cam follower pin 74 will butt on the constant radius portion 69b of the contoured edge 69 in the position $P_{1a}$. Preferably, the distance of this constant radius portion 69b from the axis of the dual drive cam 67 may be so determined that the travel of the cassette from the retracted toward the working position is cut short slightly before it arrives at the working position. The reason for this will appear in the following description.

As indicated at (B) in FIG. 24, the cassette detector switch 112 will become closed at the time $t_3$ when the cassette travels very close to the working position. The control circuit 76 will then respond by setting the cam drive motor 73 into rotation for causing the ascent of the tape transport mechanism 25 into driving engagement with the cassette. With the consequent counterclockwise rotation of the dual drive cam 67 as seen in FIG. 16, the cam follower pin 109 on the tape transport descent lever 84 will travel from position $P_1$ to position $P_2$ on the bottom face of the cam at a time $t_4$. Thus, as the tape transport ascent lever 85 turns clockwise from its FIG. 18 to FIG. 19 position under the bias of the tension spring 86, the tape transport mechanism 25 will be cammed into driving engagement with the cassette.

As has been mentioned, the cassette has not been locked in the working position but has been somewhat loosely held very shortly before that position. Consequently, the drive spindles 29 and 30 will become smoothly engaged in the hubs 10 and 11 of the cassette.

The tape transport ascent detector switch 113 will become closed at the time $t_4$, as at (D) in FIG. 24, when the driving engagement of the drive spindles 29 and 30 with the cassette hubs 10 and 11 is completed. Then the cam drive motor 73 will again be set out of rotation as at (E) in FIG. 24. As will be understood by referring again to FIG. 15, the cam follower pin 74 on the cassette shift lever 44 is in the position $P_2$ on the top face of the dual drive cam 67 at this time $t_4$, in which position the cam follower pin is just off the constant radius portion 69b of the contoured edge 69. The cassette will therefore be moved to the exact working position when engaged by the drive spindles 29 and 30, resulting in the establishment of proper data transfer contact between magnetic tape 9 and transducer 23.

It is understood that the actuator arm of the cassette detector switch 112 has some elasticity. Accordingly, the switch 112 will remain closed by the pin 114 on the cassette shift lever 44 even after the cassette has been moved to the exact working position.

It is also understood that the control circuit 76 initiates the rotation of the cassette drive motors 27 and 28 at the time $t_4$ when the tape transport ascent detector switch 113 detects the ascent of the tape transport mechanism 25 into driving engagement with the cassette. Data transfer between tape 9 and transducer 23 may therefore be commenced immediately upon loading of the cassette in the working position.

At (G) in FIG. 24 is shown the eject pushbutton switch 81 actuated at a time $t_5$ after a desired run of data transfer. Then the control circuit 76 will set the cassette drive motors 27 and 28 out of rotation, as at (C) in FIG. 24, and the cam drive motor 73 into rotation as at (E) in FIG. 24. Then the cam follower pin 109 on the tape transport descent lever will travel radially inwardly of the dual drive cam 67 as its position varies from $P_2$ to $P_3$ on the bottom face of the cam (FIG. 16). The result will be the descent of the tape transport mechanism 25 out of engagement with the cassette.

The cam follower pin 74 on the cassette shift lever 44, on the other hand, will remain in the same radial position on the top face of the dual drive cam 67 during its transition from $P_2$ to $P_3$ in FIG. 15. Accordingly, the cassette will remain in the working position during the retraction of the tape transport mechanism 25 out of engagement with the cassette.

Then, coming to the position $P_4$ at a time $T_6$, the cam follower pin 74 will start traveling radially inwardly of the dual drive cam 67. The cassette will start retracting from the working position with the consequent counterclockwise turn of the cassette shift lever 44 as seen in FIG. 4. The cassette detector switch 112 will become deactuated at a time $t_7$ immediately following the commencement of cassette retraction. Then the cam drive motor 73 will be set out of rotation at a subsequent time $t_8$ when the dual drive cam 67 returns to the initial position $P_1$, as at (F) in FIG. 24.

Possibly, a tape cassette of wrong size or type or the like may be inserted in the entrance slot 34 in use of the apparatus 20. In that case the tape transport mechanism 25 will not be fully raised into engagement with the wrong object, so that the tape transport ascent detector switch 113 will remain actuated. The control circuit 67 will maintain the cam drive motor 73, and therefore the dual drive cam 67, in rotation in the absence of the tape transport ascent signal. Therefore, if the tape transport mechanism 25 has been partly raised, it will be lowered as the cam follower pin 109 on the tape transport descent lever 84 subsequently travels from position $P_2$ to position $P_3$, FIG. 16, on the bottom face of the dual drive cam 67. Subsequently, as the cam follower pin 74 on the cassette shift lever 44 travels along the varying radius portion 69a, FIG. 15, of the contoured edge 69 on the top face of the dual drive cam 67, the wrong object will be retracted to the phantom position of FIG. 4 and then ejected by the eject lever 48.

Advantages

The advantages gained by the illustrated tape cassette apparatus 20 may be summarized as follows:

1. The mechanisms for shifting the tape transport into and out of driving engagement with the tape cassette, and for shifting the tape cassette between the working and retracted positions, are both materially simplified in construction by use of the motor 73.

2. The tape transport shift mechanism and the cassette loading and ejecting mechanism are both driven positively and in exactly timed relationship to each other by the dual drive cam 67.

3. The tape transport mechanism 25 is automatically initialized in the retracted position when the tape cassette apparatus is electrically turned on.

4. The tape transport mechanism is actuated into driving engagement with the tape cassette only after the loading of the cassette in the working position has been detected by the cassette detector switch 112, thereby precluding the possibility of improper engagement of the drive spindles in the cassette hubs 10 and 11.

5. When a tape cassette of wrong size or type is inserted, the tape transport mechanism is automatically re-retracted if the tape transport ascent detector switch 113 is not actuated. Further the wrong cassette is automatically ejected.

6. The tape transport mechanism is sprung into driving engagement with the tape cassette and is motor driven out of engagement therewith. The motor is therefore not to be overloaded when the ascent of the tape transport mechanism is impeded as by a wrong type cassette inserted in the apparatus.

Possible Modifications

Although I have shown and described the tape cassette apparatus of my invention in terms of but one embodiment thereof, I do not wish my invention to be limited by the exact details of the illustrated embodiment. The following is a brief list of possible modifications or alterations that will suggest themselves to one skilled in the art on the basis of this disclosure and within the scope of my invention:

1. The tape transport shift mechanism may be modified so that the tape transport mechanism may be motor driven for both ascent and descent, or for ascent only, instead of utilizing a spring or like resilient means for raising the tape transport mechanism into driving engagement with the tape cassette as in the illustrated embodiment.

2. The complete tape transport mechanism need not be moved up and down, all that is required being that the pair of drive spindles 29 and 30 be moved into and out of driving engagement with the cassette hubs.

3. Optical sensors or the like could be employed in place of the various detector switches.

4. A switch or sensor other than the tape transport ascent detector switch 113 could be provided for sensing the travel of the tape transport mechanism toward a position for driving engagement with the tape cassette.

5. A switch or sensor other than the tape transport ascent detector switch 113 could also be provided for sensing the completion of the driving engagement of the tape transport mechanism with the tape cassette.

6. Means other than the cassette detector switch 112 could be provided for commanding the travel of the tape transport mechanism into driving engagement with the tape cassette.

7. A timer could be employed for retracting the tape transport mechanism in event the tape transport ascent detector switch 113 does not indicate the full ascent of the tape transport mechanism within a preassigned time following the detection of the loading of the tape cassette by the cassette detector switch 112.

What I claim is:

1. An apparatus for data transfer with a tape cassette of a type having a generally flat boxlike housing accommodating a length of tape for transportation between a pair of hubs mounted within the housing for rotation about respective axes disposed in parallel spaced relationship with each other with a principal plane perpendicular to the axes of the hubs and containing said hubs, and with the tape being exposed through an aperture in a predetermined front side of the housing extending parallel to a notional line right angularly intersecting the axes of the hubs, the apparatus comprising:

(a) a transducer juxtaposed to and spaced from the predetermined front side of the housing of the tape cassette;

(b) a casing containing the transducer and having defined therein an entrance opening through which the tape cassete is to be inserted in the casing in a direction parallel to the notional line, the tape cassette lying in a preassigned retracted position within the casing upon full insertion therein through the entrance opening;

(c) cassette shift means for reciprocally moving the tape cassette relative to the casing in the principal plane of the cassette and in a direction normal to the notional line between the retracted position and a preassigned working position, the tape cassette when in the working position having its tape in data transfer contact with the transducer through the apertured front side of the cassette housing;

(d) tape transport means comprising a pair of drive spindles extending perpendicular to the principal plane of the tape cassette for linear movement in a direction parallel to the axes of the hubs into and out of driving engagement with the respective hubs of the tape cassette when said tape cassette is in the working position;

(e) a drive motor for providing rotational movement;

(f) a drive cam coupled to and driven by the drive motor;

(g) a tape transport lever pivoted by the drive cam;

(h) a tape transport shift cam coupled to the tape transport lever and thereby reciprocated linearly in a plane parallel to the principal plane of the tape cassette loaded with the apparatus; and (i) a tape transport carriage carrying the drive spindles and operatively engaged with the tape transport shift cam thereby to be moved in a direction parallel to the axes of the hubs.

2. The tape cassette apparatus of claim 1 wherein the tape transport lever is driven by the drive cam only in a direction for moving the drive spindles out of driving engagement with the cassette hubs, and wherein the apparatus further comprises:

(a) a second tape transport lever coupled to the tape transport shift cam; and (b) a spring acting on the second tape transport lever for biasing the drive spindles into driving engagement with the cassette hubs.

3. The tape cassette apparatus of claim 1 further comprising:

(a) a "power on" circuit for sensing the fact that the apparatus has been electrically turned on;

(b) a cam position detector for detecting a predetermined angular position of the drive cam in which the drive spindles are out of driving engagement with the cassette hubs; and (c) a control circuit having inputs connected to the "power on" circuit and the cam position detector and an output connected to the drive motor, the control circuit setting the drive motor into rotation with the drive cam when the apparatus is electrically turned on, and setting the drive motor out of rotation when the drive cam is revolved to the predetermined angular position by the drive motor.

4. The tape cassette apparatus of claim 1 further comprising:

(a) a spring having a biasing force on the tape transport shift cam in a direction for causing the linear movement of the drive spindles into driving engagement with the cassette hubs; and (b) a contoured cam edge formed on the drive cam and having a first portion for holding the drive spindles in driving engagement with the cassette hubs, a second portion for driving the drive spindles out of driving engagement with the cassette hubs against the force of the spring, a third portion for holding the drive spindles out of driving engagement with the cassette hubs, and a fourth portion for allowing the drive spindles to move into driving engagement with the cassette hubs under the force of the spring.

5. An apparatus for data transfer with a tape cassette of a type having a generally flat boxlike housing accommodating a length of tape for transportation between a pair of hubs mounted within the housing for rotation about respective axes disposed in parallel spaced relationship with each other with a principal plane perpendicular to the axes of the hubs and containing said hubs, and with the tape being exposed through an aperture in a predetermined front side of the housing extending parallel to a notional line right angularly intersecting the axes of the hubs, the apparatus comprising:

(a) a transducer juxtaposed to and spaced from the predetermined front side of the housing of the tape cassette;

(b) a casing containing the transducer and having defined therein an entrance opening through which the tape cassette is to be inserted in the casing in a direction parallel to the notional line, the tape cassette lying in a preassigned retracted position within the casing upon full insertion therein through the entrance opening;

(c) cassette shift means for reciprocally moving the tape cassette relative to the casing in the principal plane of the cassette and in a direction normal to the notional line between the retracted position and a preassigned working position, the tape cassette when in the working position having its tape in data transfer contact with the transducer through the apertured front side of the cassette housing;

(d) tape transport means comprising a pair of drive spindles extending perpendicular to the principal plane of the tape cassette for linear movement in a direction parallel to the axes of the hubs into and out of driving engagement with the respective hubs of the tape cassette when said tape cassette is in the working position;

(e) a drive motor for providing rotational movement;

(f) tape transport shift means including electric drive means for translating the rotational movement of the drive motor into at least either of the linear movement of the drive spindles into driving engagement with the cassette hubs or the linear movement of the drive spindles out of driving engagement with the cassette hubs;

(g) a cassette detector for detecting a fact that the tape cassette has been moved to the working position by the cassette shift means; and (h) a control circuit connected between the cassette detector and the electric drive means for causing the tape transport shift means to move the drive spindles into driving engagement with the cassette hubs when the tape cassette is moved to the working position.

6. An apparatus for data transfer with a tape cassette of a type having a generally flat boxlike housing accommodating a length of tape for transportation between a pair of hubs mounted within the housing for rotation about respective axes disposed in parallel spaced relationship with each other with a principal plane perpendicular to the axes of the hubs and containing said hubs, and with the tape being exposed through an aperture in a predetermined front side of the housing extending parallel to a notional line right angularly intersecting the axes of the hubs, the apparatus comprising:

(a) a transducer juxtaposed to and spaced from the predetermined front side of the housing of the tape cassette;

(b) a casing containing the transducer and having defined therein an entrance opening through which the tape cassette is to be inserted in the casing in a direction parallel to the notional line, the tape cassette lying in a preassigned retracted position within the casing upon full insertion therein through the entrance opening;

(c) cassette shift means for reciprocally moving the tape cassette relative to the casing in the principal plane of the cassette and in a direction normal to the notional line between the retracted position and a preassigned working position, the tape cassette when in the working position having its tape in data transfer contact with the transducer through the apertured front side of the cassette housing;

(d) tape transport means comprising a pair of drive spindles extending perpendicular to the principal plane of the tape cassette for linear movement into and out of driving engagement with the respective hubs of the tape cassette when said tape cassette is in the working position;

(e) a drive motor for providing rotational movement;

(f) tape transport shift means including electric drive means for translating the rotational movement of the drive motor into at least either of the linear movement of the drive spindles into driving engagement with the cassette hubs or the linear movement of the drive spindles out of driving engagement with the cassette hubs;

(g) means for commanding the linear movement of the drive spindles into driving engagement with the cassette hubs;

(h) means for detecting the linear movement of the drive spindles into driving engagement with the cassette hubs; and (i) a control circuit having inputs connected to the commanding means and the detecting means and an output connected to the electric drive means of the tape transport shift means, the control circuit causing the tape transport shift means to retract the drive spindles in event the drive spindles fail to make driving engagement with the cassette hubs after the commanding means has commanded the movement of the drive spindles into driving engagement with the cassette hubs.

* * * * *